US006831772B2

(12) United States Patent
Spooner et al.

(10) Patent No.: US 6,831,772 B2
(45) Date of Patent: Dec. 14, 2004

(54) OPTICAL MIRROR MODULE

(75) Inventors: Timothy Spooner, Dunstable, MA (US); Lewis Long, Woburn, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 10/198,316

(22) Filed: Jul. 18, 2002

(65) Prior Publication Data

US 2003/0147118 A1 Aug. 7, 2003

Related U.S. Application Data

(60) Provisional application No. 60/353,153, filed on Feb. 1, 2002.

(51) Int. Cl.[7] .................................................. G02F 1/29
(52) U.S. Cl. .................. 359/320; 359/223; 359/127; 257/782
(58) Field of Search .................. 359/320, 223, 359/127, 128, 163; 257/698, 676, 782, E23.037, E23.038, E23.039, E23.04; 385/17, 18, 16

(56) References Cited

U.S. PATENT DOCUMENTS

| 5,042,889 A | | 8/1991 | Benzoni ...................... 385/16 |
| 5,208,880 A | | 5/1993 | Riza et al. .................... 385/18 |
| 5,825,194 A | * | 10/1998 | Bhuva et al. ................ 324/763 |
| 5,937,115 A | | 8/1999 | Domash ...................... 385/16 |
| 5,939,782 A | * | 8/1999 | Malladi ...................... 257/698 |
| 5,963,350 A | | 10/1999 | Hill ............................ 359/127 |
| 6,097,859 A | | 8/2000 | Solgaard et al. .............. 385/17 |
| 6,201,629 B1 | | 3/2001 | McClelland et al. ........ 359/223 |
| 6,215,222 B1 | | 4/2001 | Hoen ......................... 310/309 |
| 6,267,605 B1 | | 7/2001 | Biegelsen .................... 439/81 |
| 6,445,814 B2 | * | 9/2002 | Iijima et al. ................ 382/154 |
| 6,445,841 B1 | * | 9/2002 | Gloeckner et al. ........... 385/17 |
| 6,674,173 B1 | * | 1/2004 | Wang ......................... 257/777 |
| 2001/0050787 A1 | * | 12/2001 | Crossland et al. ........... 359/15 |
| 2001/0054761 A1 | * | 12/2001 | Han et al. ................... 257/723 |
| 2002/0001870 A1 | * | 1/2002 | Oda et al. .................... 438/48 |
| 2002/0164838 A1 | * | 11/2002 | Moon et al. ................ 438/107 |
| 2003/0054588 A1 | * | 3/2003 | Patel et al. ................. 438/107 |

OTHER PUBLICATIONS

U.S. patent application Ser. No. 10/059,683, Harney et al., filed Jan. 29, 2002.

* cited by examiner

*Primary Examiner*—Ricky Mack
*Assistant Examiner*—Brandi Thomas
(74) *Attorney, Agent, or Firm*—Bromberg & Sunstein LLP

(57) ABSTRACT

An optical mirror module has an interface port that is spaced from a corresponding die. More specifically, the optical mirror module includes a substrate and a die having at least one mirror and circuitry to control the at least one mirror. The optical mirror module defines a plane that is substantially parallel to the die. The optical mirror module further includes the noted interface port, which is adapted to electrically couple the circuitry with a device external to the optical mirror module. As suggested above, the interface port is located on the substrate and spaced from the die on the plane.

20 Claims, 5 Drawing Sheets

OPTICAL MIRROR MODULE

PRIORITY

This application claims priority from U.S. provisional patent application No. 60/353,153, filed Feb. 1, 2002, entitled, "Package for Packaged Circuit," having Bromberg & Sunstein LLP, and naming Timothy Spooner and Lewis Long as inventors, the disclosure of which is incorporated herein, in its entirety, by reference.

FIELD OF THE INVENTION

This invention relates generally to optical data transmission devices and, more particularly, this invention relates to thermal management and yield of secondary assembly for optical mirror modules.

BACKGROUND OF THE INVENTION

Optical networks generally are considered the data transmission medium of choice in the networking field. Among other advantages, optical networks generally have a higher bandwidth and lower power/line loss than those that are electrically based. To that end, optical fibers carrying data typically connect with a switching device that translates optical signals into electrical signals. After they are translated, the electrical signals then are routed by the switch, and then translated back into optical signals for delivery to the next optical fiber.

It is more efficient and less costly, however, to route high bandwidth signals solely in the optical domain. In other words, eliminating the process of translating signals between the optical and electrical domains improves switch efficiency. This type of switching device (referred to as an "optical switch") typically has one or more movable internal mirrors that reflect light beams between optical fibers. One such exemplary type of optical switching device is known as an "optical cross connect switch." This type of switch (e.g., a MEMS mirror based optical cross connect switch) typically has an array of mirrors that each have a reflective metallization (e.g., gold) on its surface. This reflective metallization (or the curvature of the mirror itself) undesirably can be altered, however, if subjected to relatively high temperatures for a sustained period of time. Such temperatures typically are greater than 200 degrees centigrade.

In addition, high packaging process temperatures can create substantial mechanical stresses during or after assembly, consequently negatively impacting product performance. Accordingly, to maintain the integrity of such an optical cross-connect switch, it is important to ensure that it is not exposed to such relatively high temperatures.

SUMMARY OF THE INVENTION

In accordance with one aspect of the invention, an optical mirror module has an interface port that is spaced from a corresponding die. More specifically, the optical mirror module includes a substrate and a die having at least one mirror and circuitry to control the at least one mirror. The die has a length dimension. The optical mirror module defines a plane that is substantially parallel to the die along its length dimension. The optical mirror module further includes the noted interface port, which is adapted to electrically couple the circuitry with a device external to the optical mirror module. As suggested above, the interface port is located on the substrate and spaced from the die in a direction that is substantially parallel to the plane.

In illustrative embodiments, the substrate has a first surface and a second surface, where the interface port is located on at least one of the first surface and the second surface. The first surface may have a first surface edge portion, where the interface port is located in the first surface edge portion. In addition, the first surface may be either substantially orthogonal to the plane, or substantially parallel to the plane.

Among other materials, the substrate may include aluminum nitride. The optical mirror module also may include a hermetic layer that hermetically seals at least a portion of the die. A flexible circuit may be coupled with at least one of the interface ports.

In accordance with another aspect of the invention, an optical mirror module has a substrate with a top surface and a bottom surface, and a die. The top surface of the substrate has a top edge portion, while the bottom surface has a bottom edge portion. The die has at least one mirror and circuitry to control the at least one mirror. The optical mirror module further includes a plurality of interface ports adapted to electrically couple the circuitry with a device external to the optical mirror module. The plurality of interface ports are located on one of the top edge portion and the bottom edge portion.

In illustrative embodiments, the module forms a module plane that is substantially parallel to the die. The top and bottom edge portions are spaced from the die on the module plane. The bottom surface of the substrate has a total bottom surface area, and the bottom edge portion may define a boundary for a sub-surface area of the bottom surface. In some embodiments, the subsurface area is more than half the total bottom surface area. In yet other embodiments, the substrate between the bottom edge portion and the top edge portion defines an edge volume containing the at least one interface port.

BRIEF DESCRIPTION OF THE DRAWINGS

The foregoing description of various embodiments of the invention should be appreciated more fully from the following further description thereof with reference to the accompanying drawings wherein.

DESCRIPTION OF ILLUSTRATIVE EMBODIMENTS

In illustrative embodiments of the invention, an optical mirror module is configured to more effectively manage heat produced by its internal components. For example, illustrative embodiments of the module are configured to have sufficient substrate real estate for mounting a heat dissipating device, such as a heat sink.

To these ends, an exemplary optical mirror module includes a substrate, a die having at least one mirror and circuitry to control the mirror, and a plurality of interface ports adapted to electrically couple the circuitry with a device that is external to the module. The circuitry may include either or both the circuits that actually control the mirror and circuit traces. Accordingly, in some embodiments, the circuits that actually control the mirror may be off chip circuitry. The traces in this embodiment thus may be considered to control the mirror by means of such off chip circuitry.

The plurality of interface ports illustratively are spaced away from the die. More particularly, the module defines a plane that is substantially parallel with the die. The plurality of interface ports thus are spaced from the die on the plane. Accordingly, a relatively significant portion of the substrate is available for mounting a heat dissipating device. Details of various embodiments are discussed below.

Figure 1:
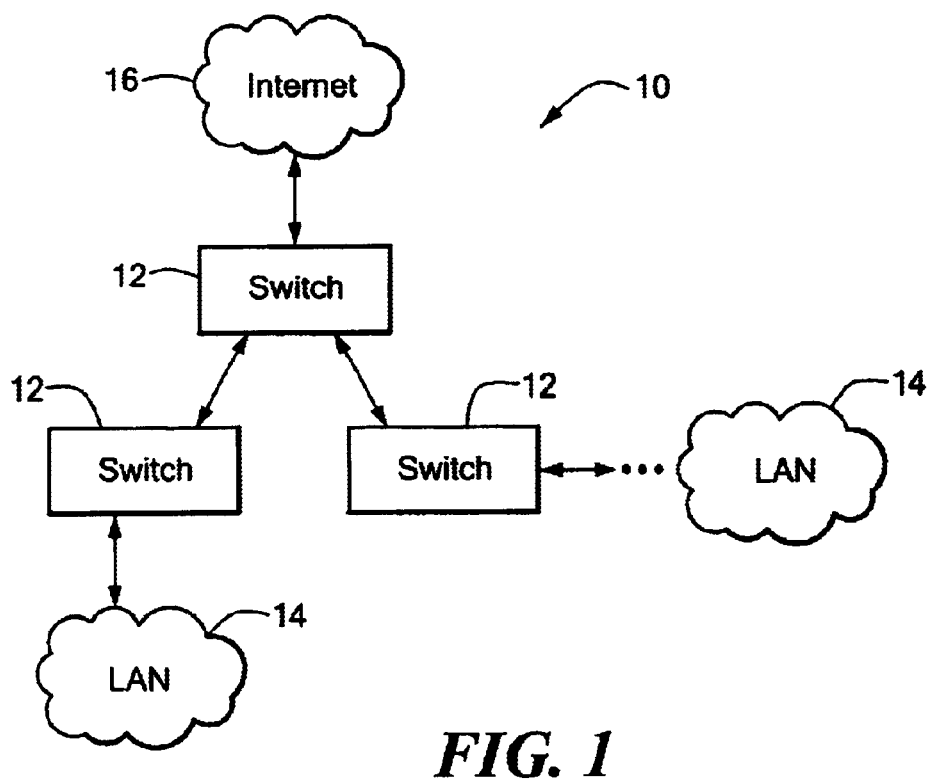
FIG. 1 schematically shows an exemplary network arrangement that may be used with illustrative embodiments of the invention.

FIG. 1 schematically shows an exemplary network 10 that may use optical switches 12 having optical mirror modules produced in accordance with various embodiments of the invention. The network 10 includes three switches 12 that connect between two local area networks 14 and the Internet 16. At least one of the switches 12 includes mirrors or lenses for redirecting light beams received over a fiber optic cable. It should be noted, however, that discussion of the network configuration shown in FIG. 1 is exemplary and not intended to limit the scope of the invention. Accordingly, other network configurations at least in part using light transmission media may be used.

Figure 2:
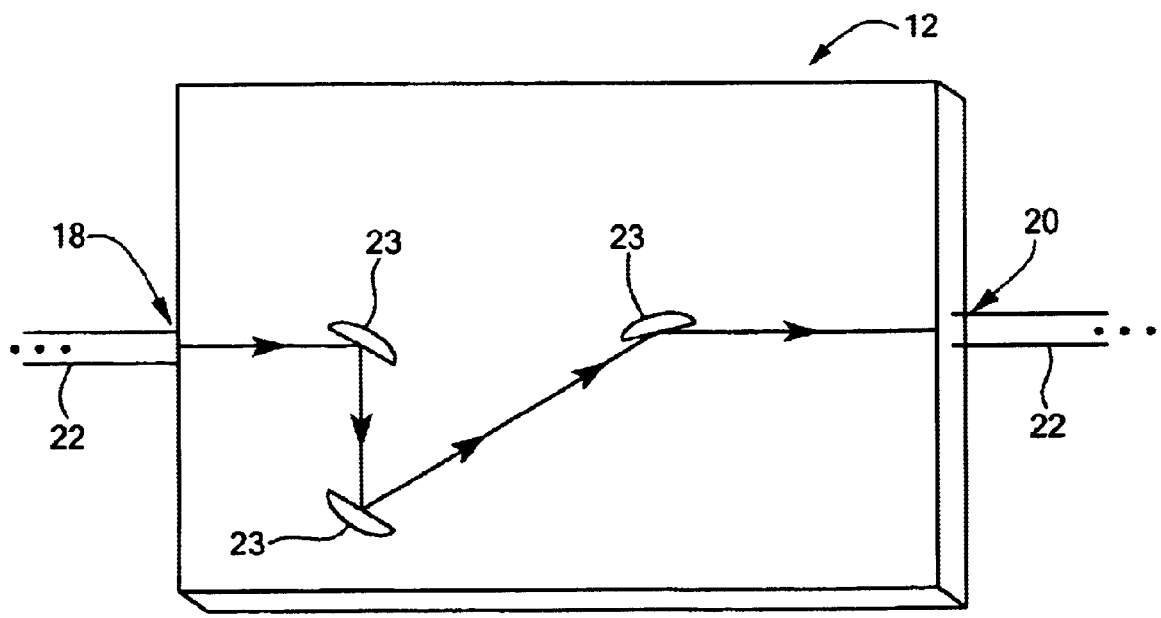
FIG. 2 schematically shows an illustrative optical switch that may be used in the network shown in FIG. 1.

FIG. 2 schematically shows an exemplary switch 12 that may be used in the network 10 of FIG. 1. The switch 12 includes an input port 18 for receiving a light beam via a fiber optic cable 22, and an output port 20 for transmitting the light beam via another fiber optic cable 22. Although multiple fiber optic cables 22 may be coupled with the switch 12 via multiple ports, only a single input and output port 18 and 20 are shown for simplicity. The switch 12 also includes three optical mirror modules 23 to reflect the incoming light beam from the input port 18 to the output port 20. In illustrative embodiments, the switch 12 is a microelectromechanical system, such as a 1×2 protection switch. Of course, various embodiments are not limited to switches. Other network devices or light processing devices that use a mirror and/or a lens may incorporate illustrative embodiments of the invention.

Figure 3:
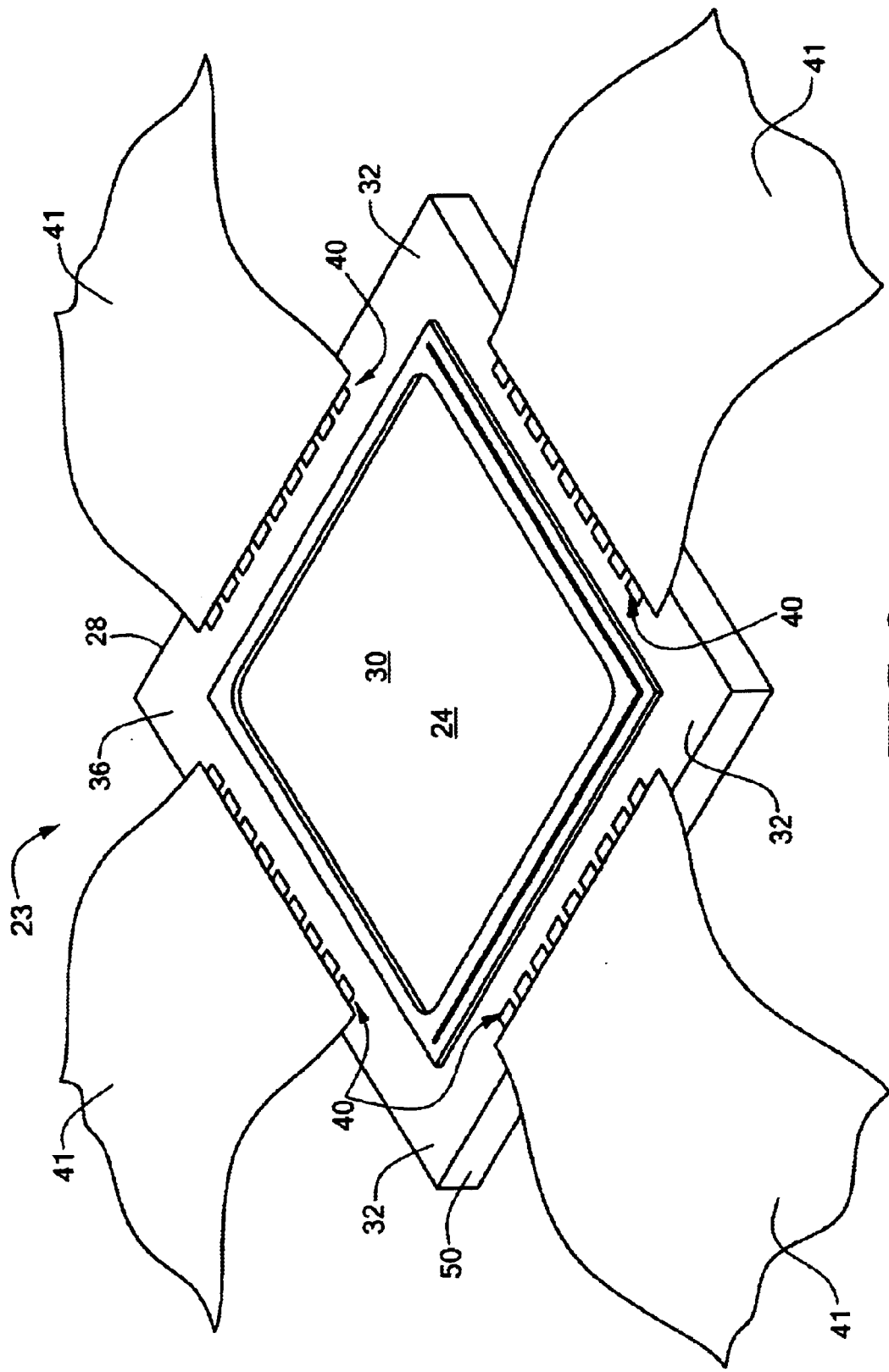
FIG. 3 schematically shows an isometric view of an optical cross-connect switch module configured in accordance with illustrative embodiments of the invention.
Figure 4A:
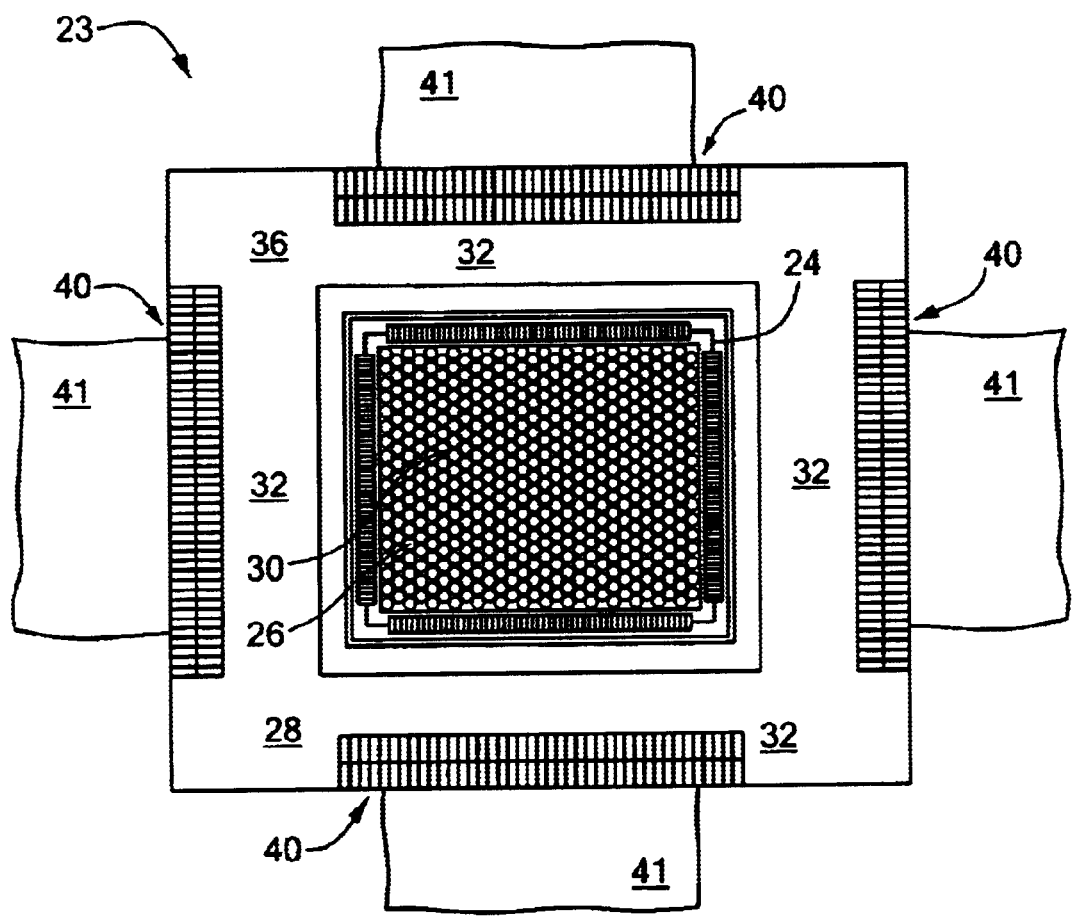
FIG. 4A schematically shows a plan view of the optical cross-connect switch module shown in FIG. 3.

FIG. 3 schematically shows an isometric view of an optical cross-connect switch module configured in accordance with illustrative embodiments of the invention. FIG. 4A shows a plan view of the same optical cross-connect switch module. The optical cross-connect switch module shall be referred to herein as "module 23." In particular, the module 23 includes a die 24 having a plurality of mirrors 26, and a substrate 28 surrounding at least a portion of the die 24. The die 24 may have any number of mirrors 26 required for a given application, such as one mirror, or 1500 mirrors. Of course, embodiments of the invention are not intended to be limited to any specific number of mirrors.

The die 24 also may include conventional circuitry for controlling the operation and movement of the mirrors 26. For example, the circuitry may include, among other things, sense electrodes for sensing mirror position, and actuation circuitry to cause the mirrors 26 to move in a controlled manner. The actuation circuitry delivers electrostatic forces to the mirrors 26, thus causing them to move as desired. In other embodiments, the circuitry may be off-board circuitry. In such embodiments, traces may extend from the electrodes to receive control signals.

The substrate 28 preferably is a multi-layer ceramic having a coefficient of thermal expansion that is relatively low for expected applications. For example, a material having a coefficient of thermal expansion on the order of that for silicon should produce satisfactory results. In illustrative embodiments, the substrate 28 is manufactured from aluminum nitride, which has such desired qualities. In some embodiments, other materials having similar qualities may be used. Accordingly, discussion of aluminum nitride is exemplary in some embodiments and not intended to limit the scope of the invention.

As shown in FIGS. 3 and 4A, the top surface 36 of the substrate 28 defines a central (open) portion 30 exposing the die 24, and an edge portion 32 between the central portion 30 and the edge of the module 23 itself. The module 23 further includes a cover 34 hermetically sealing the open portion containing the die 24. Accordingly, the cover 34 maintains a controlled environment within module 23. Details of the cover 34 and related components are discussed below with reference to FIG. 5.

A discussion of the meaning of the term "edge portion" is in order. When used herein, the term "edge portion" means that portion of the substrate 28 between the edge of the module 23 and the central portion 30. For example, the module 23 shown in FIGS. 3, 4A and 4B have a contiguous edge portion 32 encircling the central portion 30. There is no requirement, however, that any element located at the edge portion 32 be at the physical edge of the module 23. Of course, if such element is located at the physical edge of the module 23, it necessarily is considered to be located at the edge portion 32 of the substrate 28.

Those skilled in the art thus should consider elements located in the edge portion 32 to be "spaced from" the central portion 30. More particularly, the surface of the module 23 is considered to form a plane that is substantially parallel to the top surface 36 of the module 23. Note that such plane also is substantially parallel to the bottom surface 38 of the substrate 28 (see FIG. 4B), and to a significant portion of the die 24. The die 24 is considered to be spaced from the edge portion 32 along the plane because the die 24 stops where the edge portion 32 begins (along the plane). In some embodiments, the substrate 28 and die 24 may share some common area on the plane. In such event, the edge portion 32 is considered to begin where the die 24 ends.

Figure 4B:
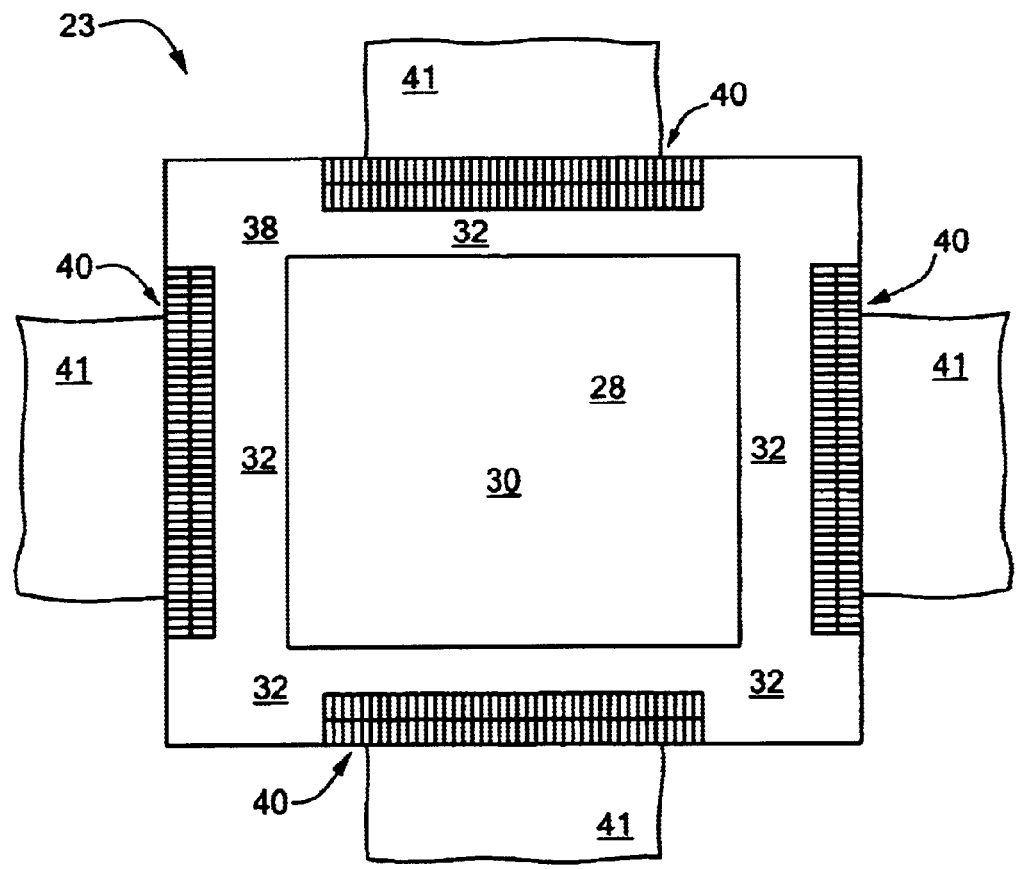
FIG. 4B schematically shows a bottom view of the optical cross-connect switch module shown in FIG. 3.

As shown in FIGS. 3, 4A and 4B, the substrate 28 further includes a plurality of interface ports 40 for electrically connecting the die circuitry with one or more devices that are external to the module 23. In illustrative embodiments, the interface ports 40 are in the edge portions 32 of the module 23. Specifically, the interface ports 40 are located at the edge portions 32 of the top surface 36 and/or the bottom surface 38.

FIG. 4B shows a relatively large amount of area (on the bottom surface 38 of the substrate 28) that is produced as a result of this configuration. Specifically, the bottom surface 38 of the substrate 28 has a total area, which is divided between the bottom edge portion 32 and the central portion 30. In illustrative embodiments, the central portion 30 has an area that is a substantial portion of the total area. Unlike the top surface 36, however, the central portion 30 on the bottom surface 38 is not closed by a cover 34. Instead, the central portion 30 of the surface is closed by the substrate itself. A heat sink or other heat dissipating device thus can be readily coupled with the central portion 30 of the bottom surface 38. No circuitry or interface ports 40 are in that area, thus permitting the connection.

Among other things, the interface ports 40 may be a plurality of pads. For example, the pads may be double row land grid arrays that physically connect with flexible circuits 41. As known by those skilled in the art, flexible circuits include circuit traces within polyimide. Such circuits can be welded onto the pads by means of a weld that is local to the pads. Accordingly, heat from the weld should have a negligible effect, if any, on the ultimate operation of the module 23. In alternative embodiments, other types of circuits may be coupled with the interface ports 40. Flexible circuits 41 thus are discussed as exemplary and not intended to limit the scope of the invention.

Figure 5:
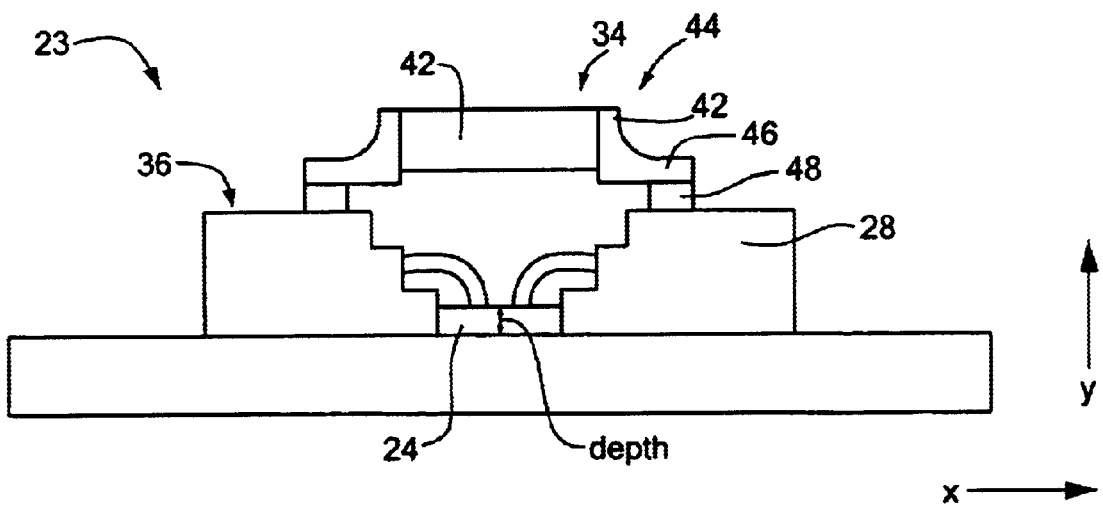
FIG. 5 schematically shows a cross-sectional view of an optical cross-connect switch module configured in accordance with illustrative embodiments of the invention.

FIG. 5 schematically shows a cross-sectional view of a module 23 configured as discussed above. Among other things, this figure more clearly shows the cover 34 secured to the top surface 36 of the substrate 28, and traces connecting the die 24 to the substrate 28. In illustrative embodiments, the cover 34 includes a borosilicate glass window 42 having an anti-reflective coating on both top and bottom surfaces 36 and 38. Alternatively, the window 42 may be a material that is opaque to visible light, but transparent to expected wavelengths (e.g., 1200–1600 nm) processed by the module 23.

The window 42 shown in FIG. 5 is mounted within a basic frame 44 having a weld flange 46. To secure the basic frame/window to the module 23, the weld flange 46 is seam welded to a kovar weld ring 48 (extending from the substrate 28) in a manner that hermetically seals the enclosed volume. Of course, other known coupling methods may be used other than seam welding. For example, soldering to metallizations on the window 42 and substrate 28.

A gas may be added to the enclosed volume to further maintain a controlled environment. Any gas commonly used for such purposes should suffice. Exemplary gasses include a noble gas, such as nitrogen.

In alternative embodiments, the die 24 is not centered within the module 23. For example, in such case, the die 24 may be at one side of the module 23, and the edge portion 32 of the substrate 28 may be at the opposing side. In yet other embodiments, the interface ports 40 are not on all (four) sides of the module 23. Instead, the interface ports 40 may be in one or more of the sides of the module 23. Furthermore, the interface ports 40 may be on one or both the top and bottom surfaces 38 and 38. The module 23 may be arranged in yet other manners and still implement illustrative embodiments of the invention.

Figure 6:
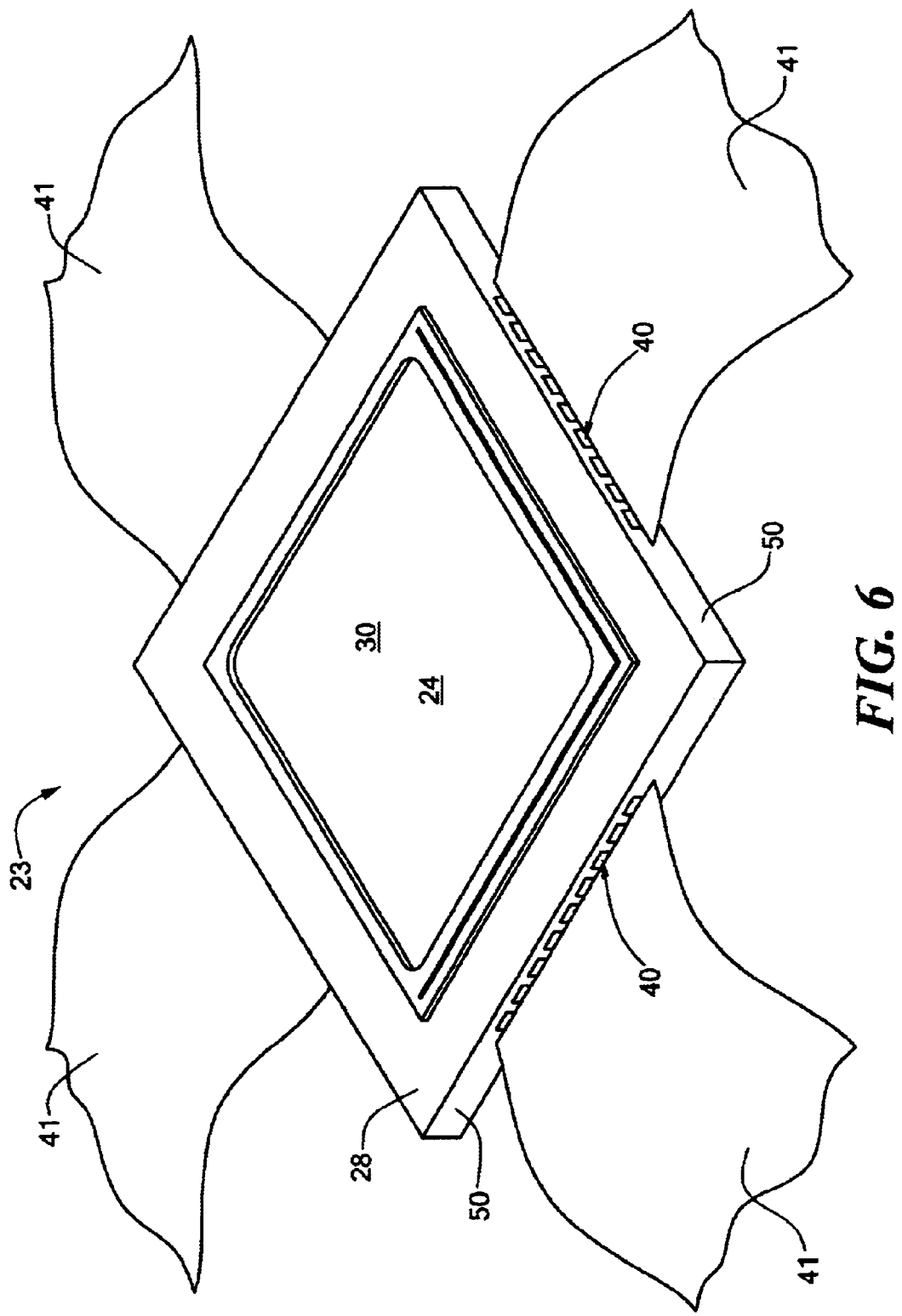
FIG. 6 schematically shows an isometric view of an optical cross-connect switch module configured in accordance with other embodiments of the invention.

FIG. 6 shows an alternative embodiment of the invention, in which the interface ports 40 are on the side surface 50 of the module 23. Although such interface ports 40 are considered to be within the edge portions 32 of the module 23, they are not considered to be on the top or bottom surface 36 and 38. Rather, as noted above, such interface ports 40 are on the side surface 50. In these embodiments, the side surface 50 may be substantially perpendicular the top and bottom surfaces 36 and 38. In yet other embodiments, the side surface 50 is not substantially perpendicular to the top and bottom surfaces 36 and 38. In such embodiments, the side surface 50 may be some other shape or irregularly shaped.

It should be noted that the die 24 is considered to have a depth dimension and a length dimension. The depth dimension essentially is the thickness of the die 24. For example, as shown in FIG. 5, the depth dimension is explicitly highlighted. In illustrative embodiments, the length dimension thus is any dimension that is substantially perpendicular to the depth dimension (i.e., in the X-direction). Accordingly, a plane that is parallel with the length dimension of the die 24 is deemed to exist (i.e., a plane parallel with the X-axis). This plane can be in any location along the Y-axis. As can be deduced by inspection, the interface ports 40 are spaced from the die 24 in a direction that is substantially parallel with the noted plane. It also should be noted that this plane can have different orientations based upon the orientation of the module 23 itself.

Those skilled in the art should understand that positioning the interface ports 40 in the described manner improves on the prior art a number of ways. Specifically, this configuration provides a relatively large area (i.e., the central portion 30) that can support a heat dissipating element (e.g., a heat sink). Interface ports 40 thus do not compete with heat dissipating elements for module real estate. Heat thus can be more readily dissipated. Moreover, welds are local to the edge portions 32. For example, if an interface port requires repair, or if an element is to be connected to an interface port, the weld is spaced away from the die 24. In many expected cases, this spacing should sufficiently isolate the weld heat from the mirrors 26 and circuitry on the die 24. This type of weld (i.e., a localized weld) avoids the use of hot, conventionally used, soldering processes, which can expose portions of the die to temperatures that can adversely affect die components. In addition, use of the noted substrate materials should further assist in the heat dissipation process by more readily transmitting heat from the die 24 through the substrate 28.

Although various exemplary embodiments of the invention have been disclosed, it should be apparent to those skilled in the art that various changes and modifications can be made that will achieve some of the advantages of the invention without departing from the true scope of the invention.

We claim:

1. A optical mirror module comprising:
   a substrate;
   a die having at least one mirror and circuitry to control the at least one mirror, the die having a length dimension,
   the optical mirror module defining a plane that is substantially parallel to the die along its length dimension; and
   an interface port adapted to electrically couple the circuitry with a device external to the optical mirror module, the interface port being located on the substrate and being spaced from the die in a direction that is substantially parallel to the plane, wherein the portion of the substrate directly beneath the die has no interface ports.

2. The optical mirror module as defined by claim 1 wherein the substrate has a first surface and a second surface, the interface port being located on at least one of the first surface and the second surface.

3. The optical mirror module as defined by claim 2 wherein the first surface has a first surface edge portion, the plurality of interface ports being located in the first surface edge portion.

4. The optical mirror module as defined by claim 2 wherein the first surface is substantially orthogonal to the plane.

5. The optical mirror module as defined by claim 2 wherein the first surface is substantially parallel to the plane.

6. The optical mirror module as defined by claim 1 wherein the substrate comprises aluminum nitride.

7. The optical mirror module as defined by claim 1 further comprising a hermetic layer that hermetically seals at least a portion of the die.

8. The optical mirror module as defined by claim 1 further including a flexible circuit coupled with the interface port.

9. A MEMS-based optical mirror module comprising:

a substrate having a top surface and a bottom surface, the top surface having a top edge portion, the bottom surface having a bottom edge portion;

a die located on the top surface of the substrate, the die having at least one mirror and circuitry to control the at least one mirror; and at least one interface port adapted to electrically couple the circuitry with a device external to the optical mirror module, the at least one interface port being located on one of the top edge portion and the bottom edge portion, wherein there are no interface ports on the bottom surface of the substrate that is directly beneath the die.

10. The MEMS-based optical mirror module as defined by claim 9 wherein the die has a length dimension, the module forming a module plane that is substantially parallel to the die along its length dimension, the top and bottom edge portions being spaced from the die in a direction that is substantially parallel with the module plane.

11. The MEMS-based optical mirror module as defined by claim 9 wherein the substrate comprises aluminum nitride.

12. The MEMS-based optical mirror module as defined by claim 9 further comprising a hermetic layer that hermetically seals at least a portion of the die.

13. The MEMS-based optical minor module as defined by claim 9 wherein the substrate between the bottom edge portion and the top edge portion define an edge volume, the at least one interface port being within the edge volume.

14. The MEMS-based optical mirror module as defined by claim 9 wherein the bottom edge portion defines a boundary for a sub-surface area of the bottom surface, the bottom surface having a total bottom surface area, the sub-surface area comprising more than half the total bottom surface area.

15. An optical mirror module comprising:

a substrate having a first surface and a second surface;

a die having at least one mirror and circuitry to control the at least one mirror, the first surface defining a plane that is substantially parallel to the die; and means for electrically coupling the circuitry with a device external to the optical mirror module, the coupling means being located on at least one of the first surface and the second surface, the coupling means also being spaced from the die on the plane, wherein the portion of the substrate directly beneath the die has no coupling means.

16. The optical mirror module as defined by claim 15 wherein the first surface has a first surface edge portion, the coupling means being located in the first surface edge portion.

17. The optical mirror module as defined by claim 15 wherein the first surface is substantially orthogonal to the plane.

18. The optical mirror module as defined by claim 15 wherein the coupling means comprises electrical pads.

19. The optical mirror module as defined by claim 15 wherein the substrate comprises aluminum nitride.

20. The optical mirror module as defined by claim 15 further comprising means for hermetically sealing at least a portion of the die.

* * * * *